United States Patent Office 3,767,731
Patented Oct. 23, 1973

3,767,731
CONTACT LENSES FROM HYDROPHILIC GEL POLYMERS OF POLYVINYLPYRROLIDONE, MONOMERIC VINYLPYRROLIDONE AND METHACRYLIC MODIFIER
Maurice Seiderman, 3306 Deronda Drive, Hollywood, Calif. 90028
No Drawing. Continuation-in-part of application Ser. No. 845,499, July 28, 1969, now Patent No. 3,639,524. This application Dec. 20, 1971, Ser. No. 210,191
The portion of the term of the patent subsequent to Feb. 1, 1989, has been disclaimed
Int. Cl. C08f 15/40; G02c 7/04
U.S. Cl. 260—885
8 Claims

ABSTRACT OF THE DISCLOSURE

A plastic or resin product obtained by mixing comminuted polyvinylpyrrolidone, vinylpyrrolidone, a modifier such as an organic methacrylate, optionally a crosslinking agent, and optionally a catalyst; and causing polymeriaztion to take place by elevating the temperature. The inventive product is insoluble in water but is hydratable with water, and may take up as much as 90% by weight of water. The hydrated product is optically transparent and especially suitable for contact lenses.

CROSS REFERENCE TO RELATED APPLICATIONS

This application is a continuation-in-part of co-pending application Ser. No. 845,499, filed July 28, 1969, now U.S. Pat. 3,639,524.

This invention relates to transparent, optically clear polymers suitable for manufacturing contact lenses, and particularly to such polymers that have been prepared with modifiers and crosslinking agents, and the method of preparation of the modified, crosslinked, optically clear polymers.

Polyvinylpyrrolidone is prepared by Reppes process. 1,4-butanediol obtained in the Reppe butadiene synthesis is dehydrogenated over copper at 200° C. to form 2-butyrolactone which, when reacted with ammonia, gives pyrrolidone. Reacting pyrrolidone with acetylene gives the vinyl pyrrolidone monomer. The monomer is polymerized by heating it in the presence of hydrogen peroxide and ammonia, as represented by the following equation:

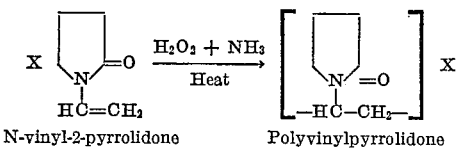

N-vinyl-2-pyrrolidone   Polyvinylpyrrolidone

Polyvinylpyrrolidone is a faintly yellow solid resembling albumin and having a medium molecular weight of about 25,000. It is soluble in water giving a colloidal solution. It has been employed to increase blood volume in shock cases and as an additive to blood plasma.

It is an object of this invention to provide polyvinylpyrrolidone polymers or resins which, unlike polyvinylpyrrolidone, are substantially insoluble in water and aqueous solutions or fluids of the type found in the human eye.

Another object of the invention is to provide a method for preparing substantially water insoluble, optically clear, modified polyvinylpyrrolidone polymers or resins.

Additional objects of the invention will become apparent from the following description, which is given primarily for purposes of illustration, and not limitation.

Stated in general terms, the objects of the invention are attained by reacting a mixture of polyvinylpyrrolidone, vinylpyrrolidone, a modifier such as an organic methacrylate, preferably a hydroxyalkyl methacrylate; and preferably a crosslinking agent such as an olefin, preferably an olefin hydroxyalkyl methacrylate; and preferably a catalyst such as an organic peroxide. The reaction product preferably is treated or extracted with water to hydrate the product or to extract unreacted or water-soluble materials respectively.

The polyvinylpyrrolidone should be comminuted, for example powdered to pass an eighty-mesh screen.

The resulting modified and crosslinked polyvinylpyrrolidone resins, or polymers, are insoluble in water or aqueous body fluids. They are clear, transparent or translucent and flexible or rubbery depending upon the amounts and type of modifiers and crosslinking agents used. The physical properties of the resins or polymers of the invention are controlled by controlling the ratios of the modifier and the crosslinking agent to the amount of vinylpyrrolidone used in the reaction mixture. Completely crosslinked polymers or resins can be made in accordance with the invention, which are hard and infusible and can be machined and polished to an optical finish for such purposes as contact lenses, for example. Incompletely crosslinked polymers or resins of the invention are fusible, and can be pressed into molds. Complete crosslinking can be acomplished by heating the molds under pressure.

The reaction mixture can contain from about 5% to about 75% of polyvinylpyrrolidone, the balance of the ingredients depending upon the physical properties desired in the polymers or resins produced. The ratio of vinylpyrrolidone to polyvinylpyrrolidone should be in the range from about 0.1 to about 70 parts per 100 parts of polyvinylpyrrolidone.

The ratio of liquid monomeric modifiers can vary from about 135 parts to about 2000 parts per 100 parts of polyvinylpyrrolidone, and especially from about 350 parts per hundred to about 1000 parts, calculated by measuring liquid monomeric modifiers in milliliters and by weighing the polyvinylpyrrolidone powder in grams.

Similarly, the ratio of the amount of crosslinking agent to the dry weight of polyvinylpyrrolidone used can vary from about 0 parts per hundred to about 25 parts per hundred, preferably from about 1 part per hundred to about 7 parts per hundred, and especially from about 2 parts per hundred to about 5 parts per hundred, calculated using dry weight of polyvinylpyrrolidone measured in grams and measuring the liquid crosslinking agents in milliliters.

Among the hydroxyalkyl methacrylate modifiers that can be used in preparing the polyvinylpyrrolidone polymers, or resins, of the invention are: 2-hydroxyethyl methacrylate and 2-hydroxypropyl methacrylate. Alkylamino alkylmethacrylate such as 2-dimethylaminoethyl methacrylate and 2-butylaminoethyl methacrylate can be used as modifiers. Other examples of methacrylates that can be used as modifiers are methacrylamide, cyclohexyl methacrylate, and tetrahydrofurfuryl methacrylate. Olefin glycol methacrylates such as triethylene glycol monomethacrylate, tetraethylene glycol monomethacrylate and propylene glycol monomethacrylate can be used as well. Other examples of modifiers are dimethylamino ethyl methacrylate, piperidinoethyl methacrylate, morpholinoethyl methacrylate, etc.

Among the crosslinking agents that can be used in accordance with the invention are olefin glycol dimethacrylates such as ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, and 1,3-butylene glycol dimethacrylate.

Among the catalysts that can be used in preparing the polymers or resins of the invention are organic peroxides such as benzoyl peroxide, lauryl peroxide, cumene hydroperoxide, dibutyl peroxide, etc. Other suitable catalysts are azobisisobutyronitrile, tertiary butyl peroxide, tertiary butyl hydroperoxide, ammonia plus hydrogen peroxide, and others. Catalysts that are harmless or noninjurious if left remaining in the products or resins, are preferred although the removal of these residues is done by extraction by hydration in large volumes of water or a continuous flow of water. The amount of catalysts employed generally ranges from zero to 1 gram per 100 milliliters of the reaction mixture. Certain compositions of the mixture require very little catalyst; others require a great deal more; and some give satisfactory resins with none.

The reaction mixture is then raised to a temperature of from about 50° C. to about 120° C. or even higher, but preferably about 60° C. to 70° C., and maintained within that temperature range until polymerization is completed, which in general requires from about ½ to about 24 hours depending upon the temperature, amount of catalyst, if any, and relative proportions of components.

The following examples illustrate the invention:

EXAMPLE 1

A reaction mixture is prepared by mixing 100 grams polyvinylpyrrolidone, 75 milliliters vinylpyrrolidone, 50 milliliters hydroxyethyl methacrylate, 5 grams ethylene glycol dimethacrylate and 0.5 gram benzoyl peroxide. The resulting mixture was poured into 5/8 inch diameter glass tubes coated with a fluorocarbon to prevent sticking of the product to the tube or breakage due to shrinkage or expansion during the polymerization reaction. The tubes were capped and placed in a hot circulating oven kept at about 65° C. for about 2 hours. The oven was shut off and the polymerization product was permitted to cool to room temperature. The tubes then were broken away and the rods of polyvinylpyrrolidone resin product were obtained. A portion of each rod was cut off and machined to a specified thickness. The cut off portion was placed in water and permitted to swell by water absorption or hydration. The amount of swelling was measured. The resultant polymer absorbed 87.2% water.

EXAMPLE 2

A reaction mixture was prepared by mixing 50 grams polyvinylpyrrolidone, 5 milliliters vinylpyrrolidone, 50 milliliters hydroxyethyl methacrylate, 5 milliliters ethylene glycol dimethacrylate and 0.1 gram benzoyl peroxide. The resulting reaction mixture was reacted in the same manner as described in Example 1. The cut off portions of the products rods absorbed only half as much water and swelled only half as much as the product rods produced by Example 1.

EXAMPLE 3

Hydroxypropyl methacrylate was substituted for hydroxyethyl methacrylate in Example 1 and the reaction conditions of Example 1 were repeated. The product thus produced was more clear and more transparent than the product obtained in Example 1.

EXAMPLE 4

Hydroxypropyl methacrylate was substituted for hydroxyethyl methacrylate in Example 2. Otherwise, the polymers were prepared as in the case of Example 2. Again the product polymer or resin rods were more transparent than those resulting in Example 2.

EXAMPLE 5

50 milliliters hydroxypropyl methacrylate was mixed with 50 milliliters of hydroxyethyl methacrylate. 25 grams of polyvinylpyrrolidone was dissolved in the mixture. 0.1 milliliter vinylpyrrolidone was added. No catalyst was used. Polymerization took 12 hours at 60° C. The product polymer or resin rods were optically transparent, very strong, resilient, and easily machinable and were made into contact lenses and worn after hydration without any difficulty. The water content was 30%.

As mentioned hereinabove the hydrophilic polymers of the present invention are particularly adapted for the preparation of contact lenses. Such lenses can be readily prepared by the general methods used for preparing contact lenses from hydrophilic polymers, which are well known to those skilled in the art and involve conventional cutting, machining, grinding, and polishing operations. Accordingly, contact lenses using the herein described hydrophilic polymers can be prepared by the techniques described in U.S. 3,408,429 and U.S. 3,361,858. Other general techniques well known to those skilled in the art are described in French Pats. 1,342,447 and 1,422,109.

A preferred method of making the contact lenses involves preparing polymerized rods as described in Example 1. Polypropylene tubes are preferably used instead of the glass tubes in order to facilitate the removal of the rods from the tubes.

The cast rods are then cut to size. The roughly cut blanks are approximately 19/64" (.297 or 7.5 mm.) thick and 9/16" (.562 or 14.5 mm.) in diameter.

Since cutting sets up internal stresses in the polymer, each button ready for production undergoes an additional annealing operation by exposure for at least two hours at 78° C. in a circulating air oven.

After the blank is annealed, it is kept away from the open air as the material is highly hygroscopic.

The blank is then placed into a collet and the proper negative curve (base curve) is cut into the blank and the blank is reduced to the proper diameter.

After the blanks are cut to precise size, the annealing is repeated for one hour, after which time the blanks are placed in a Mason jar or vacuum desiccator and sealed tightly to keep out all moisture from the air.

All cutting is done with diamond tools, with the lathe revolving at a high speed and with a slow tool approach. Deep cuts are avoided since they may produce invisible fractures that could eventually cause breaking of the lens when in use.

When the base curve is cut and before the blank is removed from the lathe, it can be reduced to the proper diameter and the edges may be finished on the lathe.

The blank is then polished with a conventional polish. The polishing blocks and laps can be of any material. Stainless steel (303), "Lucite" or "Plexiglas" are preferred.

The best base curve polishing has been done by using a "Plexiglas" block with handkerchief-type cotton cloth tightly stretched and held in place with a neoprene "O" ring (preferably with a loop of stainless steel wire).

For blocking, a low temperature wax is generally used. Over-heating the compound is avoided as this may affect the polished surface. In removing the lens from the blocking compound, the arbor is warmed and any blocking compound sticking to the lens is removed with Reagent grade Petroleum Ether, wiping with a soft tissue.

After the lenses are checked for dimensions and power while in the dry state, they are extracted in order to remove all debris resulting from manufacturing procedures.

The extraction is carried out with a buffered saline solution containing 0.9% sodium chloride and 0.004% sodium bicarbonate. This solution will have a pH of from about 7.0 to 7.2. The saline solution is kept at about 68° C. and the lenses are placed in the heated, circulated solution overnight. A condenser is used to minimize solvent loss.

The clean and aseptic lenses are removed and each stored in about 10 cc. of sterile, buffered saline.

During extraction, the lenses will change in size and power. The thickness, the diameter and both curvatures will increase and the power of the lens will decrease.

Obviously, many other modifications and variations of the modified and crosslinked polyvinylpyrrolidone polymers, or resins, and method of the invention are possible in the light of the teachings given hereinabove. It is, therefore, to be understood that, within the scope of the ap-

What is claimed is:

1. A contact lens comprising a hydrophilic polymer consisting essentially of a polymerized mixture of polyvinylpyrrolidone, with, for each 100 parts of the polyvinyl pyrrolidone, from about 0.1 to about 70 parts of monomeric vinylpyrrolidone; from about 135 to about 2,000 parts of a hydroxyalkyl methacrylate, from zero to about 25 parts of a crosslinking agent; and an amount of catalyst ranging from zero to about one gram thereof for each 100 milliliters of reaction mixture.

2. The contact lens of claim 1 wherein the crosslinking agent is present and is selected from the group consisting of ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, and 1,3-butylene glycol dimethacrylate.

3. The contact lens of claim 1 wherein the catalyst is present and is selected from the group consisting of benzoyl peroxide, lauryl peroxide, cumene hydroperoxide, dibutyl peroxide, azobisisobutyronitrile, tertiary butyl peroxide, tertiary butyl hydroperoxide, and ammonia plus hydrogen peroxide.

4. The contact lens of claim 1 wherein the crosslinking agent is present and is selected from the group consisting of ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, and 1,3-butylene glycol dimethacrylate, and the catalyst is present and is selected from the group consisting of benzoyl peroxide, lauryl peroxide, cumene hydroperoxide, dibutyl peroxide, azobisisobutyronitrile, tertiary butyl peroxide, tertiary butyl hydroperoxide, and ammonia plus hydrogen peroxide.

5. The contact lens of claim 1 wherein the hydroxyalkyl methacrylate is hydroxyethyl methacrylate or hydroxypropyl methacrylate.

6. The contact lens of claim 2 wherein the hydroxyalkyl methacrylate is hydroxyethyl methacrylate or hydroxypropyl methacrylate.

7. The contact lens of claim 3 wherein the hydroxyalkyl methacrylate is hydroxyethyl methacrylate or hydroxypropyl methacrylate.

8. The contact lens of claim 1 wherein the hydroxyalkyl methacrylate is a mixture of hydroxyethyl methacrylate and hydroxypropyl methacrylate and no catalyst and no crosslinking agent are present.

References Cited
UNITED STATES PATENTS

| | | | |
|---|---|---|---|
| 3,647,736 | 3/1972 | Ewell | 260—29.6 WB |
| 3,700,761 | 10/1972 | O'Driscoll et al. | 264—1 |
| 3,721,657 | 3/1973 | Seiderman | 260—80.72 |
| 3,639,524 | 2/1972 | Seiderman | 260—885 |
| 3,621,079 | 11/1971 | Leeds | 260—885 |

MURRAY TILLMAN, Primary Examiner

J. SEIBERT, Assistant Examiner

U.S. Cl. X.R.

260—29.6 WB, 875; 351—160